(12) United States Patent
Carbone

(10) Patent No.: US 7,363,506 B2
(45) Date of Patent: Apr. 22, 2008

(54) SOFTWARE VIRUS DETECTION METHODS, APPARATUS AND ARTICLES OF MANUFACTURE

(75) Inventor: Kevin J. Carbone, Glenolden, PA (US)

(73) Assignee: CyberSoft, Inc., Conshohocken, PA (US)

( * ) Notice: Subject to any disclaimer, the term of this patent is extended or adjusted under 35 U.S.C. 154(b) by 751 days.

(21) Appl. No.: 10/060,631

(22) Filed: Jan. 30, 2002

(65) Prior Publication Data

US 2003/0145213 A1    Jul. 31, 2003

(51) Int. Cl.
| | |
|---|---|
| G06F 11/30 | (2006.01) |
| G06F 12/14 | (2006.01) |
| G06F 11/00 | (2006.01) |
| G06F 12/16 | (2006.01) |
| G06F 15/18 | (2006.01) |
| H04L 9/32 | (2006.01) |
| G06F 7/00 | (2006.01) |
| G06F 17/00 | (2006.01) |
| G08B 23/00 | (2006.01) |

(52) U.S. Cl. .......... 713/188; 726/22; 726/23; 726/24; 726/25; 707/104.1

(58) Field of Classification Search .......... 713/188, 713/200; 707/104.1, 523, 524; 726/22–25
See application file for complete search history.

(56) References Cited

U.S. PATENT DOCUMENTS

| | | | | |
|---|---|---|---|---|
| 5,951,698 | A | * | 9/1999 | Chen et al. ............ 714/38 |
| 6,711,583 | B2 | * | 3/2004 | Chess et al. ............ 707/104.1 |
| 2003/0097378 | A1 | * | 5/2003 | Pham et al. ............ 707/200 |

* cited by examiner

*Primary Examiner*—Christopher Revak
*Assistant Examiner*—Shin-Hon Chen
(74) *Attorney, Agent, or Firm*—John F. A. Earley, III; Frank J. Bonini, Jr.; Harding, Early, Follmer & Frailey, P.C.

(57) ABSTRACT

Methods, apparatus and articles of manufacture for identifying, authenticating and securing code through proscribed code detection and deletion are shown. The preferred embodiments provide for scanning code to determine the presence of proscribed code and then transmitting the code to a file reconstructor upon the detection of proscribed code. At the file reconstructor, templates of the specific document type are used to provide the document file structure, and so delete with precision the proscribed code from the original code.

9 Claims, 3 Drawing Sheets

SOFTWARE VIRUS DETECTION METHODS, APPARATUS AND ARTICLES OF MANUFACTURE

The present invention relates to software virus detection. More particularly, the present invention relates to the detection of disguised software viruses in proscribed code.

BACKGROUND OF THE INVENTION

The rise of the Internet and networking technologies has resulted in the widespread transfer of code, data and files between computers. This material is not always what it seems. For example, code that is accessed on a remote machine and downloaded to a computer system can contain hostile algorithms that can potentially destroy code, crash the system, corrupt code or worse. Computer viruses also spread through infecting other programs. For example, Visual Basic for Applications, or VBA, used in Microsoft's Office suite of products, provides a portal for virus entry through malicious use of VBA. Viruses, worms and other malicious programs and code can attack VBA compliant programs through the VBA portal. Moreover, Word or other VBA programs can, through infection by a certain type of malicious code, create a VBA virus: the malicious code may itself not be a virus but creates a virus and attack other VBA and non VBA programs on the user's machine as well. An early macro virus, W97M/Wazzu.A, operated by first infecting Word's default template normal.dot and spreading to each subsequent document.

Of course, malicious code is not limited to VBA compliant programs and may take many forms and infect many levels of the system's operation. Hostile, malicious and/or proscribed code, data and files ("code" as used hereinafter generally includes "data" and "file" or "files") can infect a single computer system or entire network and so posit a security risk to the computer system or network. The user and/or administrator (generally referred to hereinafter as "user") may wish to intercept, examine and/or control such code. The user might also wish to intercept, examine and/or control other code as well, for example, code which the user does not know to be hostile, but wishes to intercept nonetheless, for example, potentially sexually or racially harassing email, junk email, etc. This latter type of code is known hereinafter as "predetermined code."

Hostile, malicious, predetermined and/or proscribed code (generally referred to hereinafter as "proscribed code") contaminate the system in a number of ways. Proscribed code, for example, may provide instructions to be carried out by software on the system, such as by the operating system, applications, etc. Viruses generally operate in this fashion. Proscribed code may also infect transmissions from the system, such as a macro virus that infects the default Word template and thus spreads by infecting documents created under the template and subsequently disseminated to other users.

Proscribed code may be present as a contiguous character string within otherwise authorized program code. As the program code is being executed by the system, the proscribed code will be executed as well. Proscribed code may be inserted in the beginning of program code, so the application or system file executing the infected program encounters the proscribed code almost immediately after beginning execution of the infected program code. Alternatively, proscribed code may be placed somewhere within the program code, and will be executed when an application or system file is pointed towards the proscribed code. This latter technique is often used by macro viruses, which may be buried in the macro section of a Word document, for example, Macros, of course, are written in VBA code in a Word 97 document and interpreted by the Word application when it opens a Word document. Because macros are essentially small programs, they are subject to infection by virus code, and Word, as it interprets the document, will interpret and run any macro code it finds, including any virus code.

The placement of proscribed code within otherwise non proscribed code is not difficult. For example, a program such as Word permits modification to the macros section of a document, permits a user to add macros, etc. What may be difficult, however, is reading macros, through a non-Word program. Reading macros is difficult because Word (as well as many other programs) structures documents as complicated files in a manner that may be difficult to understand. So, for example, although macros may be often be located in a certain section of a Word document, where the macro section begins and ends may not be entirely clear. Moreover, a macro, and/or the macro section may be spread out in non contiguous blocks throughout a Word document, so that the beginning or end of the section is not clear. Attempting to understand this structure is extremely difficult.

Presently, antivirus programs that attempt to protect systems or networks from proscribed code may protect the system or network from the effects of the code, but may not remove the proscribed code from the system or network. Antivirus programs may not remove proscribed code because the antivirus program may only, upon detecting proscribed code, modify the pointers or other addresses to the code, rather than attempting to remove the code. Removal may be too difficult for the antivirus program, because of the difficulties associated with attempting to understand the file structure or by making no distinction between different file structures. Thus, although an antivirus program may alter the address of proscribed code in a file, thus making it difficult to run the code, the antivirus program may still permit the spread of proscribed code, by failing to remove the proscribed code from a file or program.

Prior art mechanisms also may, by failing to remove viruses, maintain ghost code, which is virus code left after the disinfection mechanism merely alters a location pointer. These ghosts may then be detected by other antivirus mechanisms thus slowing the process and possibly confusing the user.

Moreover, virus detection mechanisms typically detect viruses by reading through the document's code in a brute force type of detection. That is, the virus detection mechanisms of the prior art makes no distinction between the sections of code which might simplify and accelerate the scanning process. For example, a Word 97 document typically contain sections which may be divided into a Header Block, Document Property Blocks and Text Blocks. Macros, which are stored in Document Property Blocks, cannot be located in the Header Block or Text Blocks. Thus a macro virus would not be stored in a Text Block. Nevertheless, prior art virus detection mechanisms typically will scan text blocks for viruses, as they do not differentiate between document types nor sections thus lengthening the scanning process.

Further complications may arise from cross-platform transmissions of code. For example, a Word document, created in a Windows environment, may be transmitted through or stored in a UNIX® environment. The Word document, because it is created through a Windows environment for a Windows application, may not be capable of being reviewed in Unix® by an antivirus program. Thus infected documents can be disseminated through numerous platforms.

Accordingly, it is an object of the present invention to provide methods and apparatus for proscribed code detection.

It is a further object to simply and efficiently detect proscribed code.

It is a further object to simply and efficiently detect proscribed code and strip proscribed code from a non proscribed file.

It is a further object to simply and efficiently detect macro viruses and strip macro viruses from a non proscribed file or document.

It is a further object to detect proscribed code in a network or enterprise environment where cross platform transmission of proscribed code may occur.

SUMMARY OF THE INVENTION

The present invention comprises methods, apparatus and articles of manufacture for identifying, authenticating and securing code through proscribed code detection and deletion. In preferred embodiments, these systems and methods comprise an antivirus engine as well as a file reconstructor. The file reconstruction is specific to the particular file, which has been identified by its header or other information. Once a file reconstructor is selected, it is reviewed. Dangerous areas, e.g., the macro areas, is identifiable according to a file template, assisting in the reconstruction and appropriate actions taken as desired.

The especially preferred embodiments operate in a UNIX® environment while reading files from Windows and other environments.

DETAILED DESCRIPTION OF THE PREFERRED EMBODIMENTS

The preferred embodiments comprise methods, apparatus, and articles of manufacture for identifying, disabling and stripping proscribed code. The proscribed code may be present in a non-proscribed file or code (the terms are used intechangeably hereinafter) such as a Microsoft Word document.

Figure 1:
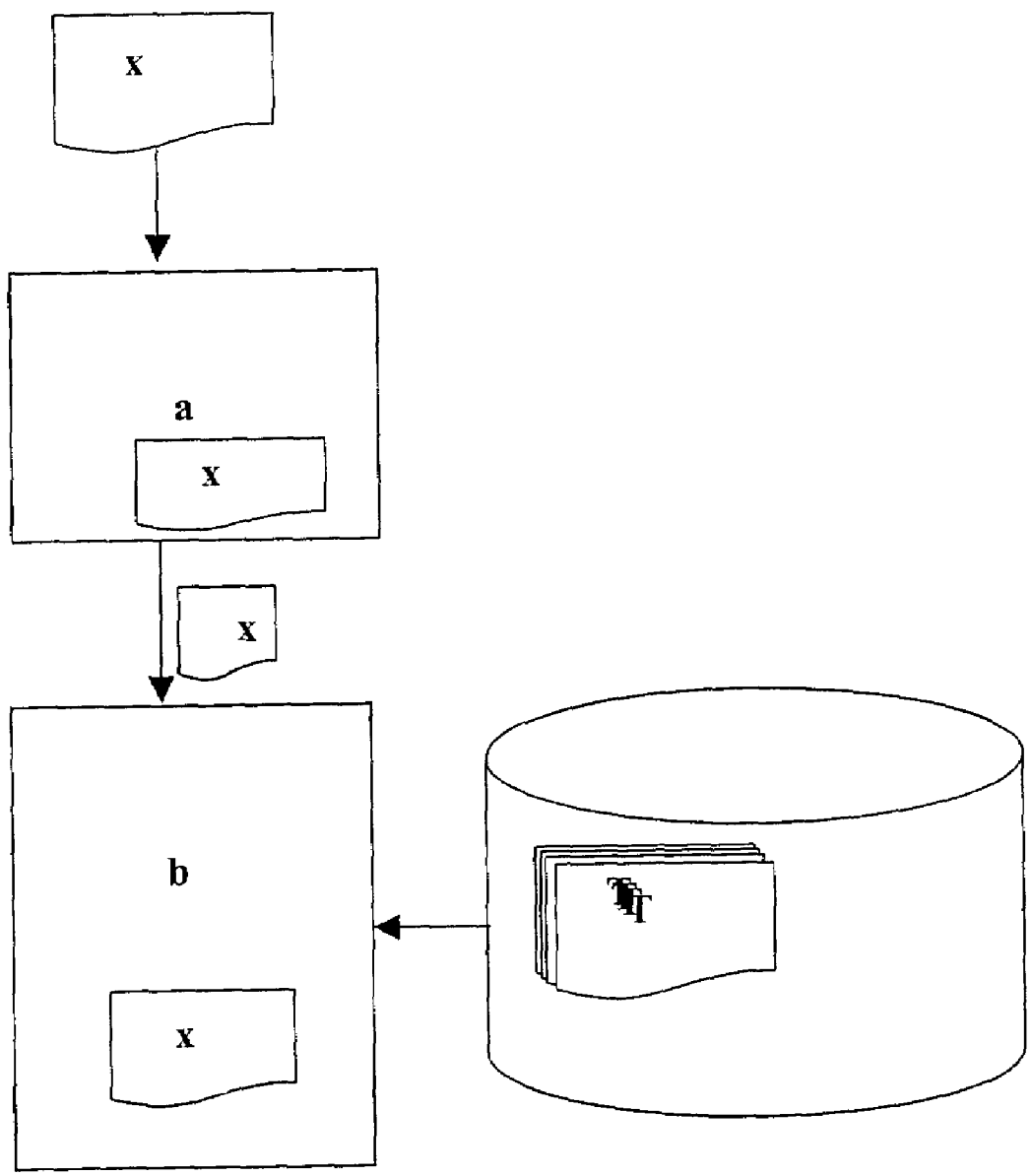
FIG. 1 is a schematic diagram of operation of a preferred embodiment.

FIG. 1 shows a schematic view of a preferred embodiment. At a is a proscribed code scanner. Especially preferred embodiments use VFIND®, from CyberSoft, Inc., as a proscribed code scanner, although proscribed code scanners as known in the art may be used. The code to be examined (which may be any type of code) is intercepted and provided to the proscribed code scanner a by any desired manner by various embodiments. For example, the code may be automatically scanned, on any desired scanner. As another example, code may be scanned as it is transmitted through a network and/or to a system.

An embodiment, for example, may be placed so as to intercept code upon the opening of a STREAMS device if operated within a STREAMS enabled Sun Solaris Unix® platform. Other embodiments may intercept, examine and/or control code in any Stream. Of course, other embodiments, on Unix® or other platforms, may also intercept code at other locations on a communications channel or layers in a communications stack. Code may also be manually examined, that is, examined as desired by a user, administrator, etc.

The proscribed code scanner examines the code according to the scanner's configuration settings. These settings can take numerous forms, including scanning for specific proscribed code or code segments, e.g. virus code, calculating hash codes of the code or code segment and then scanning a database of proscribed hash codes, etc.

The proscribed code scanner will then take one of two actions, depending upon the presence of proscribed code. If proscribed code is not present, the examined code continues its travel throughout the system and/or network. If proscribed code is present in the examined code, the examined code is sent to code reconstructor b where it is reconstructed according to code template T.

Code template T provides file reconstruction according to the document structures stored within the template. Each template is specific according to the file type. The specific stored code template T for any particular file is retrieved by initially examining file header identification, and then, if necessary, other information within the body of the file. For example, the initial eight-byte identifier, D0 CF 11 E0 A1 B1 1A E1, identifies a document as a Microsoft document. Other information then identifies the document as a Word document. A Microsoft Word document template is then called. (If there is no file identification information, the code will be held in a buffer for appropriate system administrator review.)

Once the template is retrieved, the reconstructor is able to break the file into its various data structures, as is described further below.

The templates are of any desired type file. For example, .exe files, .com files, Word .doc files, Excel .xls files, other OLE files, etc. may all have templates in the template storage area of this embodiment. Some code may share templates as well, for example, Word, Excel and other OLE files may have matched, shared templates.

As noted above, templates provide reconstruction of the file structure. A Microsoft Word 97 template, for example, provides reconstruction of a Word document. For example, a Word document typically comprises 512 byte Blocks in a sequential numbering scheme beginning with a Header Block at position −1. The Header Block, in turn, begins with an eight-byte identifier: D0 CF 11 E0 A1 B1 1A E1 (hexadecimal.) (Terms such as "Header Block," etc. are used herein to indicate particular component blocks, but are not intended to serve, aside from their use herein, as terms known in the art for these component blocks.) The Header Block also contains information about and addresses to certain subsequent 512 byte Blocks which contain information about document properties. These certain subsequent Blocks, called herein Document Property Blocks, include macros, fonts, formatting, OLE links, printing instructions, etc.

Aside from the subsequent Document Property Blocks, other 512 byte Blocks comprise the Word document. These other 512 byte Blocks are called herein Text Blocks, as they contain the text of the document. Of course, the Text Blocks may contain more than 512 bytes of text, and the Document Property Blocks contain more than 512 bytes of document property information. Therefore, each of the types, Document Property Blocks and Text Blocks, may be comprised of one or more Blocks with the number depending upon size and complexity of the document.

Internal pointers provide the path to execute the document. The map may begin with code references in the Header Block, so that, for example, the application typically reads a Document Property Block Start Block Location code reference in the Header Block. That Document Property Block Start Block Location code reference, once followed, ends in a Document Property Block Start Block Location, which in turn may contain other code references to be followed by the Word application. Macros are one type of document property contained in Document Property Block (s) and their location within the document code is found by following the various references throughout the document's code.

By applying a template permitting reconstruction of the document's structure, the embodiment is able to track and delete proscribed code. For example, proscribed code might potentially be broken into pieces throughout a Word document, and reassembled as the document is executed by Word upon opening. Prior art scanning applications might detect only pieces of the proscribed code in such an instance, and perhaps not eliminate the code totally. In contrast, the present invention provides for file reconstruction according to its data structure identification.

Thus, for example, a Word template is constructed according to the typical Word document style, which then can be used to reconstruct the Word document without exposing the system to any proscribed code that might be contained in the document.

Figure 2:
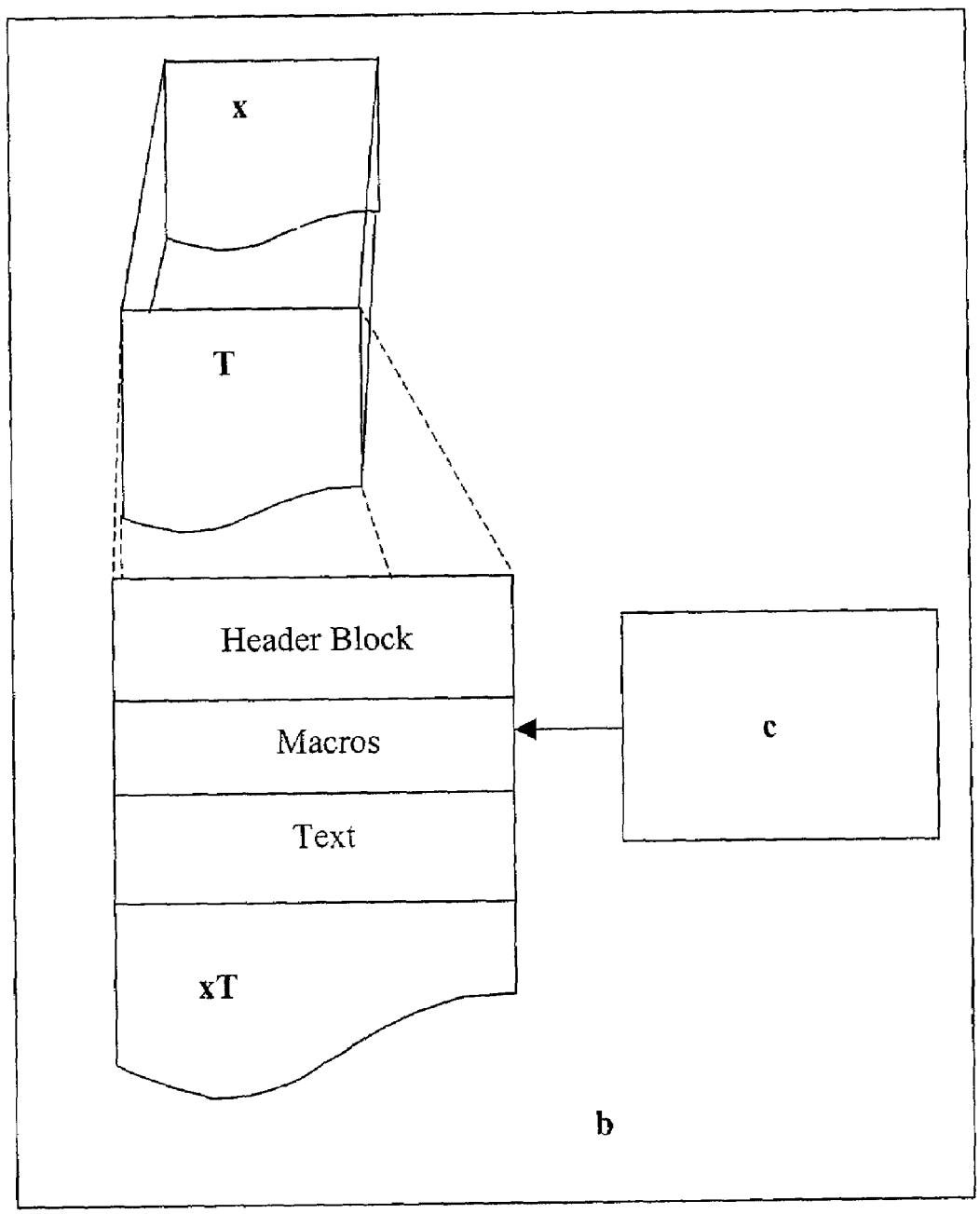
FIG. 2 is a schematic diagram of operation of a preferred embodiment.

Once the template is called, and turning to FIG. 2, the code or document (the words are used synonymously herein) is parsed by way of reconstructor b and template T. Use of a template provides specific targeting for repair component c. For example, if Word document x is sent to reconstructor b as is shown in the Figure, Word template T will be matched to the document, reconstructing the document and resulting in document xT. Macros in document xT are then specifically identified. After identification, repair component c will then erase all macros in the documents by overwriting the infected area with nulls. The code is then returned to the channel from whence it came. A user, sysop or another may also be notified that an infection was found and deleted, that the document has been disinfected, etc. Alternatively, and in some embodiments, the code may then be returned to the proscribed code scanner to ensure that the proscribed code has been deleted and not further distributed, and then returned to its path, user, sysop and/or another notified, etc. It should be noted that the proscribed code deletion of this embodiment prevents further distribution and propagation of the proscribed code which may be extremely desirable. Of course, in other embodiments, the code may be extracted and held for review. Other methods of deletion may also be used as are known in the art.

Figure 3:
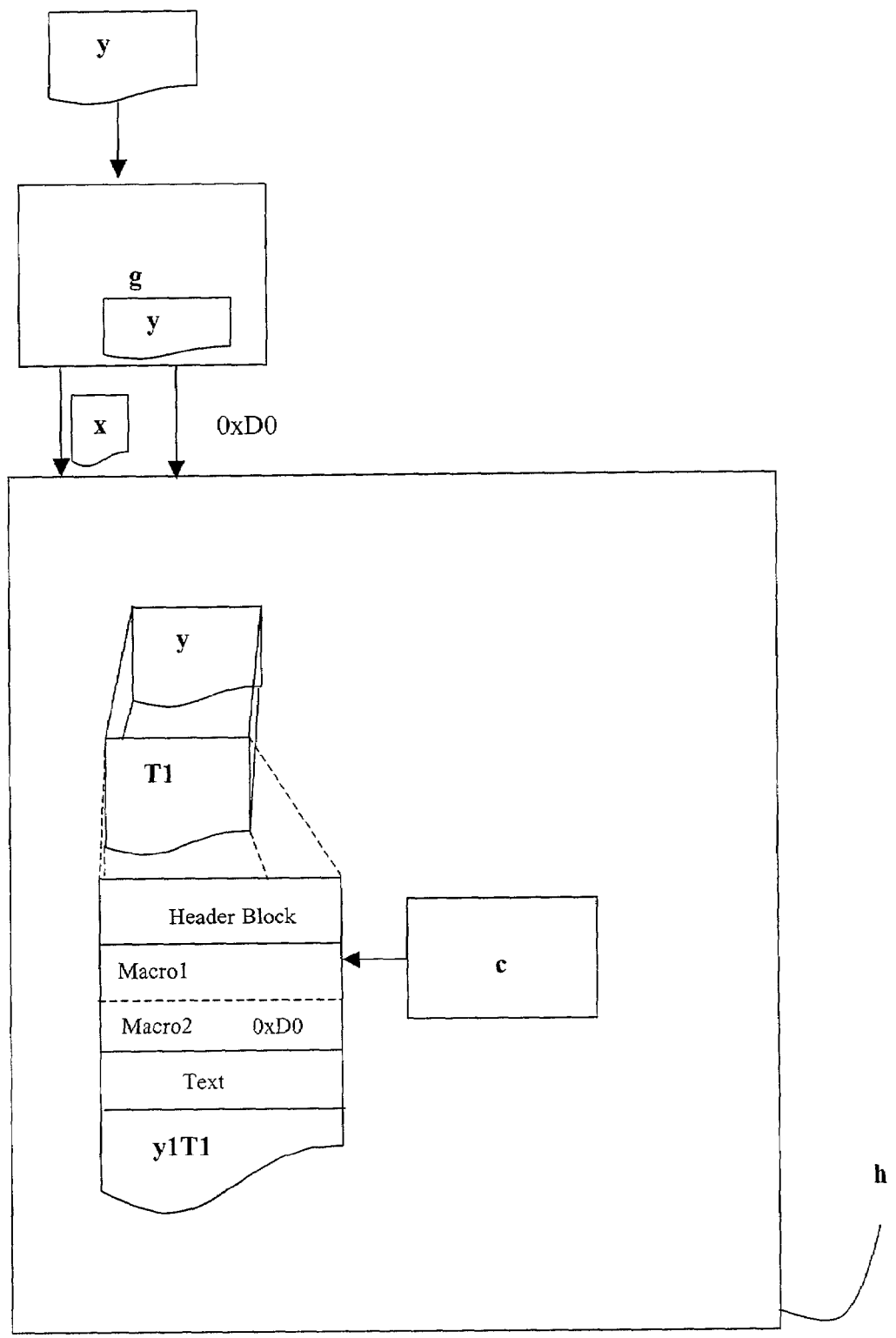
FIG. 3 is a schematic diagram of operation of a preferred embodiment.

Other embodiments may selectively delete code. For example, a preferred embodiment of which an example is shown in FIG. 3, has a proscribed code scanner component g and code reconstructor h. In this embodiment, when proscribed code scanner g detects the presence of proscribed code, it notes the proscribed code location in hexadecimal and transfers the location information as well as the infection information to code reconstructor h. Code reconstructor h then, by use of the location information, is able to locate the infected area. An appropriate template may be used as well. As shown by the example of FIG. 3, document y is infected with proscribed code, e.g., at location 0xD0 in document y1. The proscribed code scanner component of this embodiment has identified the proscribed code location and transferred that information to the code reconstructor h of this embodiment. Code reconstructor h matches the document to the appropriate template, here T1, and, along with the location information, e.g., at location 0xD0 in document y1T1, determines the infected area. In this example, the location information and template has identified the proscribed code within a specific macro. The document will then be disinfected by repair component c, through deleting the macro in the document by overwriting the macro with nulls. Other methods of deletion may also be used as are known in the art. The document may then be returned to the channel.

The especially preferred embodiments may be used in operating system platforms that are not compatible with the original source code. For example, by use of a preferred embodiment on a UNIX® platform, suspect code from a Word97 document originating upon a Windows platform may be examined. The embodiment is placed at an appropriate point in the document's transmission, such as, for example, on a UNIX® mail server, and incoming and outgoing email is intercepted by a proscribed code scanning component. Upon detection of an infected document the suspect code will be sent to a code reconstructor component, matched against a code type template, by way of the file header identification, if the code possesses a file header identification. If there is no file header identification, the code will be held in a buffer for appropriate system administrator review.

The document may then be parsed by way of code reconstructor and the appropriate template, and the proscribed code deleted by overwriting with nulls. Of course, in other embodiments, the code may be extracted and held for review. Other methods of deletion may also be used as are known in the art.

It should be noted that in yet other embodiments, code reconstructors may be placed upstream from a proscribed code scanner. In these embodiments, once the code is reconstructed, it is sent to a proscribed code scanner for examination and review. Thus code that is broken apart may be reassembled and detected. Similarly, for even more intensive review of the code, an embodiment may place code reconstructors before and after a proscribed code scanner or scanners.

By use of this embodiment, as well as other embodiments, proscribed code can be identified through cross platforms, including platforms that may be incompatible with the suspect code. It should be noted that any code may examined using embodiments of the present invention, as well as that set forth specifically above. It should also be noted that code may be flagged, or otherwise designated or noted, and with or without further action, by various other embodiments.

The foregoing description of the embodiments generally uses Windows operating system terminology. However, it should be specifically understood that embodiments can be implemented in other Unix® and Unix®-like platforms, including but not limited to Linux® and its variants, as well as the various Windows operating system platforms including but not limited to Microsoft Windows® XP, Windows NT, Windows® 2000, Windows® 95, 98 and Me, as well as IBM OS/390, MacOS, VxWorks® and others.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A proscribed code detection method that utilizes a stored code template to reconstruct a file according to the file's data structure identification to facilitate restoration of document structure and/or properties, comprising: examining a file to determine whether proscribed code is contained within the file by scanning said file with a proscribed code scanner, and where proscribed code is not present in the examined file permitting the file to continue its intended path of travel, and where proscribed code is present in the examined file, sending said file to a reconstructor, and locating proscribed code within a file sent to said reconstructor; analyzing said file header information and any other information contained in the body of said file which is needed in conjunction with said file header information to determine whether there is correspondence with a stored code template; and where there is correspondence between a stored code template:

selecting a said corresponding stored code template for said file which is specific for said file based on said file type;
   applying said stored code template to said file;
   reconstructing said file by means of said stored code template; and,
   modifying at least part of said file containing said proscribed code, wherein said stored code template corresponds with said file's data structure identification to facilitate differentiation of said file's structure;
   and where there is no correspondence with a stored code template, holding said file in a buffer for further processing.

2. A method as in claim 1 further comprising the step of intercepting said file as it is transmitted through a communication channel.

3. A method as in claim 1 wherein selecting a template for said file further comprises the step of selecting a template from a predefined group of templates.

4. A method as in claim 1 wherein the step of determining the file type further comprises determining the file type from information contained within the file, including one or more document property blocks.

5. The method of claim 4, wherein at least one document property block comprises a file header block.

6. A method as in claim 1 wherein the step of modifying at least part of said file containing said proscribed code further comprises deleting said at least part of said file containing said proscribed code.

7. A method as in claim 4 wherein deleting said at least part of said file containing said proscribed code further comprises deleting at least some of the macro part of said file.

8. A method as in claim 1 further comprising implementing said method on a first platform, for scanning said code that is generated by a second platform.

9. The proscribed code detection method of claim 1, wherein the step of modifying at least part of said file containing said proscribed code comprises removing the code in said file that corresponds with the code of a stored code template and replacing that code with the code of said stored code template.

\* \* \* \* \*